(No Model.)  E. R. HOWARD.  2 Sheets—Sheet 1.
COIN CONTROLLED APPARATUS.

No. 600,314.  Patented Mar. 8, 1898.

Witnesses
Harry W. Hahn
Victor J. Evans

Inventor
Edward R. Howard.
By John Wedderburn
Attorney (No Model.)  2 Sheets—Sheet 2.

E. R. HOWARD.
COIN CONTROLLED APPARATUS.

No. 600,314. Patented Mar. 8, 1898.

Witnesses
Harry N. Hahn
Victor J. Evans

Inventor
Edward R. Howard
by John Wedderburn
Attorney

UNITED STATES PATENT OFFICE.

EDWARD R. HOWARD, OF LAWRENCEVILLE, PENNSYLVANIA.

COIN-CONTROLLED APPARATUS.

SPECIFICATION forming part of Letters Patent No. 600,314, dated March 8, 1898.

Application filed August 11, 1897. Serial No. 647,886. (No model.)

*To all whom it may concern:*

Be it known that I, EDWARD R. HOWARD, of Lawrenceville, in the county of Tioga and State of Pennsylvania, have invented certain new and useful Improvements in Coin-Controlled Apparatus; and I do hereby declare the following to be a full, clear, and exact description of the invention, such as will enable others skilled in the art to which it appertains to make and use the same.

This invention relates to improvements in coin-actuated delivery apparatus; and it consists of certain novel constructions, combinations, and arrangements of parts, all of which will be hereinafter more particularly set forth and claimed.

Figure 1:
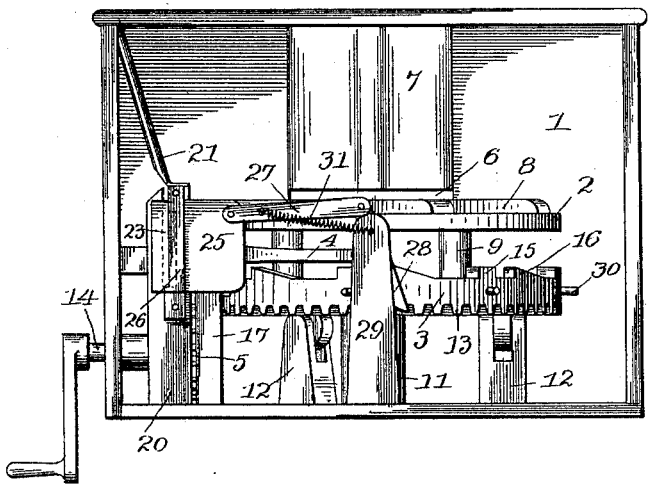
Figure 2:
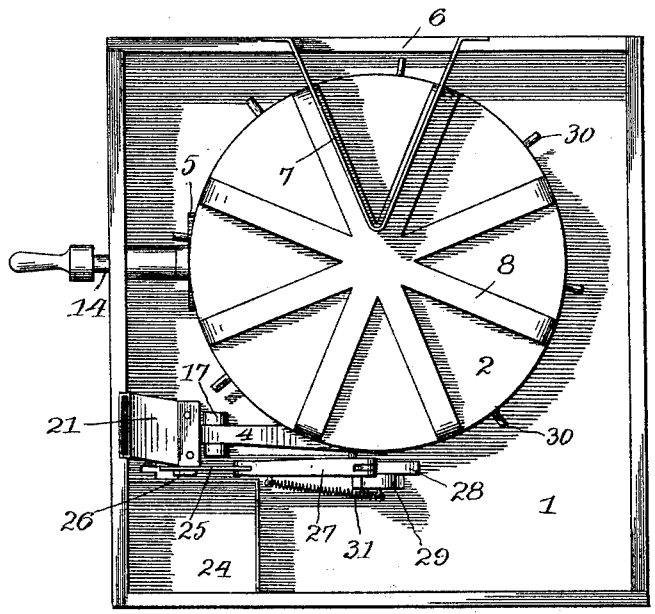
Figure 3:
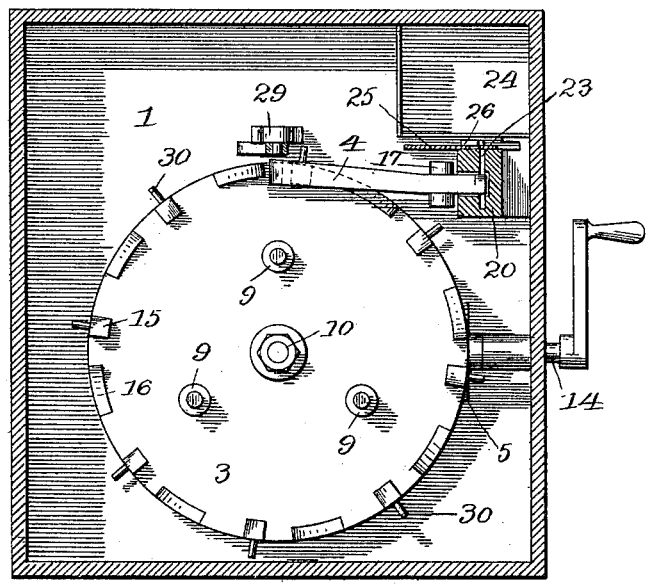
Figure 4:
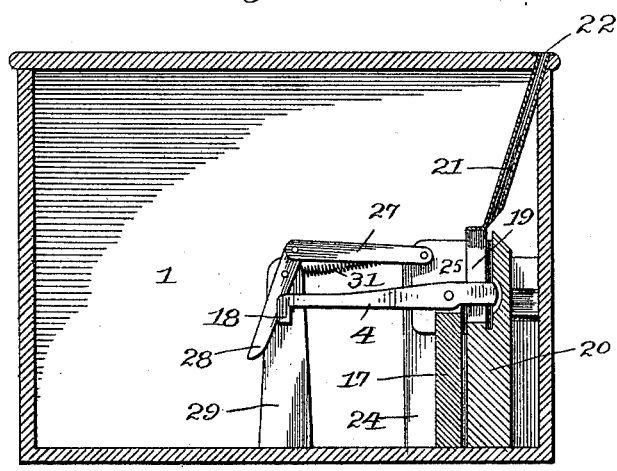

In the accompanying drawings, forming part of this specification, Figure 1 represents a rear elevation of the device embodying my invention, the back of the casing being removed to expose the interior. Fig. 2 represents a top plan view of the same with the top of the casing removed. Fig. 3 represents a horizontal section taken just above the operating-disk, and Fig. 4 represents a vertical transverse section taken on the line of the locking-pawl.

1 in the drawings represents the containing-casing; 2, the delivery-disk; 3, the operating-disk; 4, the locking-pawl, and 5 the operating-gear.

The casing 1 may be of any desired construction, with the exception that it is provided with a glass front, so that the articles upon the platform 2 may be readily seen. The said front is formed with an opening 6, in which is mounted an approximately V-shaped partition 7, extending rearwardly into said casing. The upper portion of the disk 2 is provided with a plurality of radiating vertical partitions 8, dividing the upper surface of the disk into a plurality of spaces or compartments into which the articles to be vended are placed. It will be observed that by this means the compartments formed upon the upper surface of the disk 2 correspond in outline with the shape of the partition 7, the lower edge of which is adapted to lie directly above said partitions 8, so that when the disk 2 is rotated the compartments will be brought successively into communication with the exterior of the casing by passing under the lower edge of said partition 7. The disk 2 is supported in position and rotated by the operating-disk 3, which is connected thereto by a plurality of supporting-standards 9. Said disk 3 is in turn rotatably mounted upon a pivot-bolt 10, secured in a suitable block 11, mounted upon the upper surface of the bottom of the casing 1. The weight of said disk 3 is further supported by a plurality of anti-friction-rollers 12, suitably journaled upon the base of the casing and adapted to contact with the under side of said disk. The under surface of said disk 3 is provided with a plurality of rack-teeth 13, arranged concentrically about its center in proximity to its periphery and engaged by the gear-wheel 5, which is mounted upon a crank-shaft 14, journaled in the side of the casing 1, so that it may be operated from the exterior of said casing. The upper surface of said disk 3 is provided with a plurality of rectangular lugs 15 and a plurality of triangular lugs 16, said lugs being in pairs, as shown in the drawings.

The locking-pawl 4 is journaled in a suitable standard 17, mounted upon the base, and is provided at its forward end with a nose 18, adapted to ride up over the inclined surface of the projections 16 and drop into the space between said projections and the companion projections 15 and thus lock the disk 3 against rotation. The forward end of said pawl 4 projects laterally into a vertical passage 19, formed in a suitable standard 20, which latter is mounted upon the bottom of the casing 1. The passage 19 communicates at its upper end with a coin-chute 21, which latter in turn communicates with a slot 22, formed in the top of the casing, so that a coin may be inserted at will. Said standard 20 is further provided in one side in proximity to the inwardly-projecting end of the pawl 4 with a vertical slot 23 for the discharge of the coin into a suitable money-receptacle 24, mounted in the casing 1. This slot 23 is normally closed by a slotted slide 25, mounted between the standard 26 and adapted to be guided by a pivoted pitman 27, which latter is connected to a lever 28, pivotally mounted upon a vertical standard 29, which latter in turn is mounted upon the bottom of the casing 1. The periphery of said disk 3 is provided with a plurality of openings or radial projections 30, adapted to contact with the lower end of the lever 28 at stated intervals, so as to move the slide 25 to cause its slot to correspond in position with the slot 23 of the standard 20, and thus permit the coin resting upon the pawl 4 to discharge laterally from said standard and drop into the coin-receptacle 24. The discharge is effected by the peculiar mounting of the pawl 4 out of the true center of the passage 19, which causes the predominating weight of a coin resting upon said pawl to be thrown to its rear side, so that the coin normally rests against the slide 25.

It will be observed from the foregoing description that when the coin is dropped into the chute 21 it passes down into the passage 19 and engages the rear end of the pawl 4, thus raising the forward end of said pawl and disengaging the nose 18 from the projections 15 and 16. The crank-shaft 14 is now operated, which causes the rotation of the disks 2 and 3 and brings the proper compartments under the V-shaped partition 7, so that its contents may be removed by the purchaser through the opening 6 in the front of the casing. This movement of the disk 3 brings one of the pins 30 into contact with the lever 28, and thus operates the slide 25 to permit the coin to pass laterally from the standard 20 and thus release the pawl, which rides up the inclined face of one of the projections 16 and drops into the space between the projections 15 and 16 and again locks the disk 3 in position against any further rotation.

The relative arrangement of the pairs of projections 15 and 16, the pins 30, and the slide 25 is such that the pawl 4 is released from the coin and permitted to drop into position for relocking the disk shortly after the movement of said latter disk is commenced, whereby all danger of the disk 2 being turned more than the length of one compartment is avoided. In order to return the slide 25 to its original position after being operated by the lever 28, I connect the pitman 27 to the standard 29 by a suitable coil-spring 31.

I do not care to limit myself to any particular application of my invention, as the same may be aptly employed in connection with the automatic vending of any articles which may be convenient to place in the compartments upon the disk 2 and pass under the lower edge of the partition 7. The pawl 4 is so weighted that a nickel alone will operate the same, the weight of a penny or dime not being sufficient to tip said pawl.

Having thus described my invention, what I claim as new, and desire to secure by Letters Patent, is—

1. In a coin-controlled apparatus, the combination of a suitable casing, a rotatable disk mounted therein and adapted to contain the article to be vended, a pivoted pawl adapted to engage and lock said disk in its respective positions, a coin-chute traversed by the pawl and adapted to conduct the coin to said pawl to operate the same, a member having a slot, means for normally closing the slot, and devices for operating said disk, substantially as described.

2. In a coin-controlled apparatus, the combination of a suitable casing having an opening formed therein, a partition having its respective ends connected to the walls of said opening for guarding its vertical area, a rotatable disk mounted in said casing so as to pass under said partition, whereby the articles upon the same may be removed, means for rotating said disk, and a coin-controlled locking-pawl for said disk, substantially as described.

3. In a coin-controlled apparatus, the combination of a suitable casing, a rotatable disk mounted therein, means for rotating said disk, a coin-chute, a pivoted pawl adapted to engage said disk and projecting into said coin-chute so as to be operated by a coin resting thereon, and a slide adapted to be operated by the rotation of the disk to release the coin from the pawl, substantially as described.

4. In a coin-controlled apparatus, the combination of a suitable casing, a rotatable disk mounted therein, a plurality of projections mounted upon said disk, a coin-controlled pivoted pawl adapted to engage said projections, a slotted slide for releasing the coin from said pawl, and gearing for operating said disk, substantially as described.

5. In a coin-controlled apparatus, the combination of a suitable casing having an opening formed in its front, of a partition having its respective ends mounted in said opening and adapted to guard the vertical area of the same, a rotatable disk mounted in said casing and provided upon its upper surface with a plurality of compartments adapted to be brought successively under said guarding-partition, means for rotating said disk, and a coin-controlled locking-pawl engaging said disk, substantially as described.

6. In a coin-controlled apparatus, the combination of a suitable casing, a rotatable disk mounted in the same, means for rotating said disk, a coin-controlled locking-pawl engaging said disk, a slide adapted to release the pawl from the coin, and a lever connected to said slide and adapted to be struck by suitable projections upon the disk, whereby the coin is released from the pawl upon the movement of the disk, substantially as described.

In testimony whereof I have signed this specification in the presence of two subscribing witnesses.

EDWARD R. HOWARD.

Witnesses:
O. C. FLETCHER,
C. T. LEAVENWORTH.